2,903,423
REMOVING SOOT FROM AN AQUEOUS SLURRY BY MEANS OF AN OIL-IN-WATER EMULSION

Hendrik Mondria and Willem Hendrik Logman, Amsterdam, Netherlands, assignors to Shell Development Company, New York, N.Y., a corporation of Delaware No Drawing. Application June 10, 1957
Serial No. 664,494

Claims priority, application Netherlands August 14, 1956

4 Claims. (Cl. 210—21)

This invention relates to an improved process for the removal of soot from suspension thereof in water.

Gaseous mixtures resulting from partial combustion of hydrocarbon materials are commonly used for synthesis. These gaseous mixtures which usually contain principally hydrogen and carbon monoxide, nearly always carry some soot since where there is incomplete combustion, the formation of free carbon is practically unavoidable. If the gaseous mixture is to be utilized in a chemical process, it becomes necessary to remove the carbon from the product gas prior to its utilization. The carbon so removed is available for use as carbon black. Various schemes have been proposed and are used for the removal of solid carbon contained in these product gases, for example, by the use of Cottrell precipitators, and by scrubbing with water. Water scrubbing is perhaps the most popular and wide-spread procedure for carbon removal from product gases but unfortunately, this procedure has its shortcoming in that the removal of the carbon from the scrub water presents an additional difficulty. It has been proposed heretofore that hydrocarbon oils which have a relatively greater affinity for the soot than water be used to separate the carbon from the scrub water. Various liquid hydrocarbons have been suggested, among these pentane, benzene, toluene, and light naphthas. The soot and the added hydrocarbon form agglomerates, usually in the form of pellets containing a small amount of water, which pellets float on the surface of the scrubbing water and may be readily removed from the aqueous phase by screening, filtering, decanting or the like.

It has now been discovered that the duration of the contacting time between the aqueous soot suspension (the scrub water) and the added liquid hydrocarbon may be greatly reduced when the hydrocarbon is added to the aqueous soot suspension in the form of an aqueous oil emulsion, rather than adding the hydrocarbon as such.

In the improved process of the invention the aqueous soot suspension is intimately mixed with an added or preformed emulsion of a liquid hydrocarbon to form agglomerates of the soot and hydrocarbon. The agglomerates are then removed from the aqueous phase, this normally being accomplished by floating the agglomerates to the surface where they may be readily separated by skimming.

The aqueous oil emulsion may be prepared by mixing the liquid hydrocarbon vigorously with water, for example, in a propeller mixer or the like. The ratio by weight of the quantities of the oil phase to the aqueous phase in the emulsion may vary within wide limits, viz. from 1:100 to 1:1, and preferably the ratio by weight is within the range of 1:5 to 6:10. It may be desirable in some instances to stabilize the emulsion and this will be the case especially where the prepared emulsion is stored for a period of time before use. The stability of the emulsion may be improved by adjusting the pH of the aqueous phase to the alkaline side or by adding a compatible emulsifying agent. The preferred emulsifiers include the nonionic surface active agents such as the ethylene oxide condensates of alkyl phenols or fatty acids.

The hydrocarbons which may be used in the process of the invention include, for example, pentane, hexane, heptane, benzene, toluene or the like and mixtures of hydrocarbons such as hydrocarbon oil distillates or residues such as gasoline, kerosene, gas oil and residual fuel oils. Cracked products such as heavy gas oil obtained in cracking are also suitable. The hydrocarbon material used should be liquid at the temperatures encountered and oils which are highly viscous should be avoided as the advantage in their use will be slight.

The quantity of hydrocarbon used in the form of an oil-in-water emulsion is preferably about 0.8–10 grams of the hydrocarbon per gram of soot present in the water soot suspension (scrub water).

With the use of an emulsion containing a low viscous hydrocarbon such as benzene, the soot is rapidly separated from the aqueous suspension in a few seconds but with the use of heavier hydrocarbon materials such as gas oil, a somewhat longer contact time is required. When light hydrocarbons are used in a quantity of approximately 3 grams per gram of soot, a powder is formed which is dry to judge from its external appearance. However, when gas oil is used, the agglomerates formed are larger, more in the nature of pellets.

The invention is further illustrated by the following examples:

EXAMPLE I

The material treated in this example was a suspension of soot in water obtained by the quenching of a hot gas mixture with cold water. The hot gas mixture was derived from the incomplete combustion of a light gasoline fraction with oxygen in the presence of steam. This aqueous soot suspension contained 12 grams of finely divided soot (specific area 300 sq. m./g.) per liter.

In accordance with conventional practice, 300 grams of this aqueous soot suspension was stirred with 3.6 grams of benzene in a propeller type mixer with the propeller shaft being rotated at 800 r.p.m. After 25 seconds of stirring, visible agglomerates of soot and benzene first appeared. Upon completion of the stirring, a clear water layer was formed on which powdered agglomerates floated. The agglomerate appeared to be dry and was separated by filtration. In accordance with the process of the instant invention, 3.6 grams of benzene was emulsified with 5.4 grams of water through stirring of both phases in a high speed mixer whose shaft rotate at a rate of 10,000 r.p.m. The resulting oil-in-water emulsion was stirred into 300 grams of the previous described aqueous soot suspension. Visible agglomerates of soot and benzene were first formed within only two seconds and on completion of stirring a clear water layer was formed as before on which the agglomerates floated. This remarkably demonstrates the advantage to be had in the practice of the process of the invention.

EXAMPLE II

Other portions of the same water-soot suspension of Example I were treated with several different gas oil in water emulsions under conditions, and with the results given in the table. This conditions and procedures are identical to those described immediately above. Here the pellets obtained from the treatment were found to contain approximately 5% by weight of water. The numbers appearing in the right hand column of the table are the contact times expressed in seconds required for the agglomerates of soot and gas oil to first become visible.

Table

| Suspension, Grams | Soot, Grams | Gas Oil, Grams | Gas Oil in Emulsion Consisting of 40 Parts by Weight of Gas Oil and 60 Parts by Weight of Water, Grams | Contact Time, Seconds |
|---|---|---|---|---|
| 300 | 3.6 | 4.5 |  | 300 |
| 300 | 3.6 |  | 4.8 | 10 |
| 300 | 3.6 | 6.0 |  | 60 |
| 300 | 3.6 |  | 6.2 | 3 |
| 300 | 3.6 | 7.5 |  | 30 |
| 300 | 3.6 |  | 7.5 | 2 |

The results given in the table of these tests show clearly the considerable reduction in contact time available with the use of oil-in-water emulsions instead of the hydrocarbon alone.

We claim as our invention:

1. In a process for removing soot from suspension in water, employing a liquid hydrocarbon and wherein said hydrocarbon is mixed into the water-soot suspension to form soot-hydrocarbon agglomerates which separates to the water surface and are removed therefrom, the improvement comprising intimately mixing an added aqueous emulsion of the liquid hydrocarbon into the water-soot suspension, said hydrocarbon emulsion being supplied in an amount effective to form agglomerates of the soot and hydrocarbon, continuing the mixing and promptly separating the formed agglomerates to the surface of the water without the intermediate formation of a stable emulsion of hydrocarbon in all of the water of said mixture, said formation of the agglomerates and their separation to the water surface being achieved in significantly less time than is required with the use of the hydrocarbon alone for this purpose, and thereafter removing the agglomerates from the water surface.

2. A process in accordance with claim 1 wherein the ratio by weight of the quantities of hydrocarbon to water in the emulsion lies in the range between 1:100 and 1:1.

3. A process in accordance with claim 1 wherein the quantity of hydrocarbon used in the aqueous emulsion is in the range of 0.8 to 10 grams per gram of soot present in the water suspension.

4. A process in accordance with claim 1 wherein the oil-in-water emulsion contains no emulsifying agent.

References Cited in the file of this patent
UNITED STATES PATENTS

| | | |
|---|---|---|
| 2,599,496 | Epps | July 3, 1951 |
| 2,761,563 | Waterman et al. | Sept. 4, 1956 |